Jan. 11, 1949.  W. H. YEAMANS  2,458,669
SPRING BALANCE
Filed Dec. 10, 1946
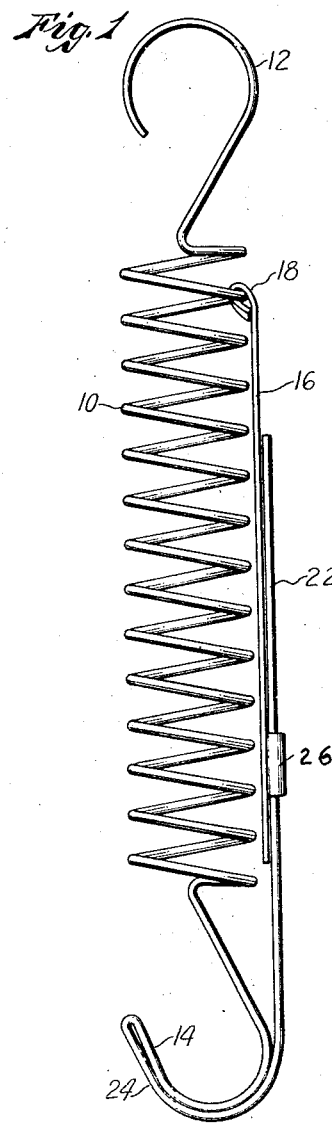
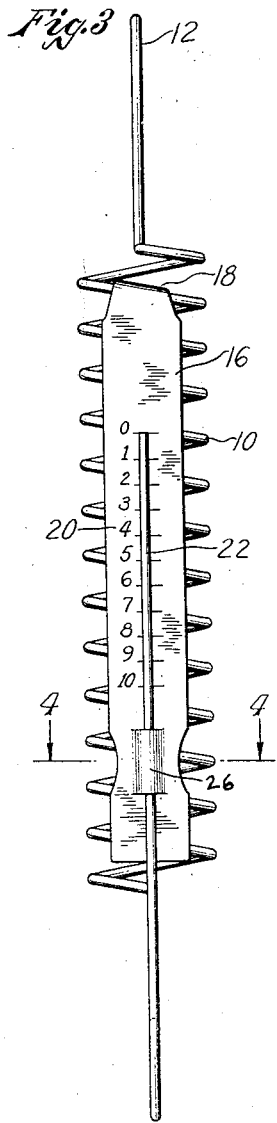
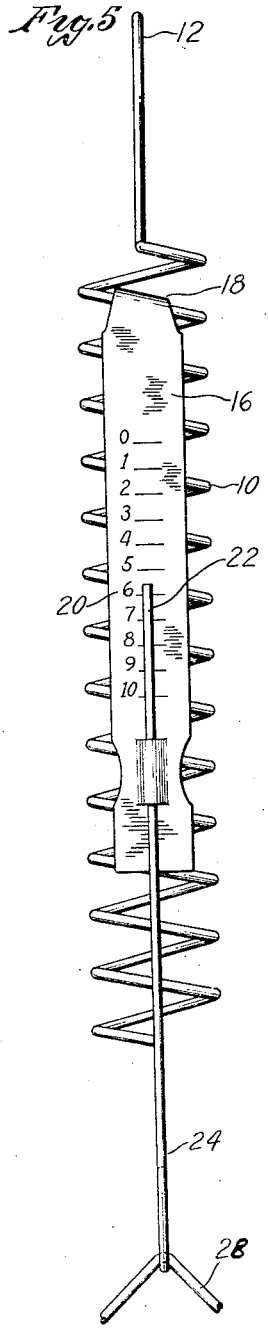
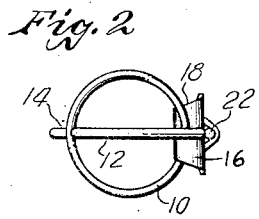
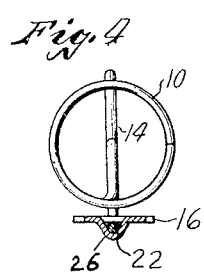
INVENTOR.
WILFRED H. YEAMANS
BY S. Jay Teller
Attorney Patented Jan. 11, 1949

2,458,669

UNITED STATES PATENT OFFICE 2,458,669

SPRING BALANCE

Wilfred H. Yeamans, Plainville, Conn.

Application December 10, 1946, Serial No. 715,260

5 Claims. (Cl. 265—63)

The general object of the invention is to provide a spring balance which is simple in construction and which can be manufactured at very low cost. This object is attained in part by the provision of only two parts which constitute the entire spring balance. Each of these parts can be inexpensively made from standard material.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing:

Fig. 1 is a side view of a balance embodying the invention.

Fig. 2 is a top view.

Fig. 3 is a side view taken from the right with respect to Fig. 1.

Fig. 4 is a horizontal sectional view taken along the line 4—4 of Fig. 3.

Fig. 5 is a view similar to Fig. 3 but showing the balance extended in accordance with a weight thereon.

Referring to the drawing, 10 is an extensible coil spring of relatively large diameter and having a susbtantial number of convolutions. The spring is provided at its upper end with means 12 for engagement with a suitable support, which support may be the hand of the user. Preferably and as shown, the engagement means 12 is formed integrally with the spring 10, the wire of the spring being extended and bent to form a hook. The spring is provided at its lower end with means 14 for engagement with an object to be weighed. Preferably and as shown, the engagement means 14 is formed integrally with the spring 10, the wire of the spring being extended and bent to form a hook.

A longitudinally extending scale plate 16 is provided which is immediately adjacent the spring 10 and which extends substantially from end to end thereof when the spring is at its initial length. This plate is connected with one convolution of the spring near one end thereof, preferably near the upper end thereof. This connection may advantageously be effected by forming the plate with a loop 18 which embraces or substantially embraces the spring convolution. The plate is longitudinally graduated at 20, the graduations being adapted to indicate the weight of an object to be weighed held by the connection means or hook 14. The graduations may be assumed to indicate pounds, but the invention is not so limited.

For cooperation with the graduations at 20, there is provided a longitudinally extending indicator rod 22. This rod 22 is connected with one of the engagement means at the end of the spring, and when the plate 16 is connected with a convolution near the top of the spring, as is preferred, the said rod is connected with the lower engagement means or hook 14. The rod 22 extends directly from the last engagement means to the scale plate 16. The rod 22 is longitudinally movable relatively to the plate 16 and the graduations 20, and a portion of the rod, preferably the extreme end thereof, cooperates with the graduations to indicate the weight of the object to be weighed. When the plate is connected at its lower end, as is preferred and shown, the plate is stationary or substantially so and the rod moves vertically.

The invention is not necessarily limited as to the manner of connection of the rod 22, but preferably the wire at the end of the hook 14 is doubled back upon itself as shown at 24, thus forming a double hook. The wire is extended and further bent so as to constitute the rod 22. Thus in the preferred embodiment of the invention as shown, the hook 12, the spring 10, the double hook 14, 24 and the indicator rod 22 are all formed integrally from a single wire.

A suitable means 26 is provided for guiding the rod 22 for relative longitudinal movement with respect to the plate 16. The guiding means 26 for the rod 22 is preferably an integral portion of the plate 16 which is offset forward and bent to form a loop through which the rod 22 can freely move.

In use, as indicated in Fig. 5, the balance is suitably supported at the top by means of the hook 12, and the object to be weighed is held by the double hook 14, 24, a cord or wire 28 being indicated for holding the said object. The weight of the object extends the spring 10, and the amount of spring extension and the weight of the object are indicated by the position of the end of the rod with respect to the graduations 20. As shown in Fig. 5, the weight of the object being weighed is 5½ pounds.

In manufacture the parts 12, 10, 14, 24 and 22 can be made from a single piece of wire, and the plate 20 can be made from a strip of metal with the loop 18 partly open. Then the plate can be assembled with the rod 22 extending through the guide 26. Finally the loop 18 can be engaged with the spring convolution, and then closed by a suitable tool.

What I claim is:

1. In a spring balance, the combination of an extensible coil spring provided at its upper end with means for engagement with a support and provided at its lower end with means for engagement with an object to be weighed, a longitudinally graduated scale plate immediately adjacent one side of the spring and extending substantially from end to end thereof when the spring has its initial length, the said scale plate being directly connected with a convolution near one end of the spring, and a longitudinal indicating rod connected with the engagement means at the opposite end of the spring, the said rod extending directly from the last said engagement means to the scale plate and being guided for relative longitudinal movement with respect to the plate and cooperating with the graduations thereon to indicate the weight of the object to be weighed.

2. In a spring balance, the combination of an extensible coil spring provided at its upper end with means for engagement with a support and provided at its lower end with means for engagement with an object to be weighed, a longitudinally graduated scale plate immediately adjacent one side of the spring and extending substantially from end to end thereof when the spring is at its initial length, the said plate having an integral loop at one end which engages a convolution near one end of the spring, and a longitudinal indicating rod connected with the engagement means at the opposite end of the spring, the said rod extending directly from the last said engagement means to the scale plate and being guided for relative longitudinal movement with respect to the plate and cooperating with the graduations thereon to indicate the weight of the object to be weighed.

3. In a spring balance, the combination of an extensible coil spring provided at its upper end with means for engagement with a support and provided at its lower end with means for engagement with an object to be weighed, a longitudinally graduated scale plate immediately adjacent one side of the spring and extending substantially from end to end thereof when the spring is at its initial length, the said scale plate being directly connected with a convolution near one end of the spring and the said plate having an integral offset portion constituting a guide, and a longitudinal indicating rod directly connected with the engagement means at the opposite end of the spring, the said rod extending through the said guide on the plate and being relatively longitudinally movable therein and the said rod cooperating with the graduations on the plate to indicate the weight of the object to be weighed.

4. In a spring balance, the combination of an extensible coil spring provided at its upper end with means for engagement with a support and provided at its lower end with means for engagement with an object to be weighed, a longitudinally graduated scale plate immediately adjacent one side of the spring and extending substantially from end to end thereof when the spring is at its initial length, the said scale plate being directly connected with the spring near the upper end thereof, and a longitudinal indicating rod which is an integral extension of the engagement means at the lower end of the spring, the said rod extending directly from the last said engagement means to the scale plate and being guided for longitudinal movement along the plate and cooperating with the graduations thereon to indicate the weight of the object to be weighed.

5. In a spring balance, the combination of an extensible coil spring formed of wire which is extended at its upper end to provide means for engagement with a support and which is extended at its lower end to provide a hook for engagement with an object to be weighed, the wire of the said hook being doubled back upon itself to provide an upward extending longitudinal indicating rod extending along one side of the spring, and a longitudinally graduated scale plate adjacent the last said side of the spring and having an integral loop at its upper end which engages a convolution of the spring near the upper end thereof, the said scale plate having an integral offset portion constituting a guide for longitudinal movement of the indicator rod and the graduations on the plate cooperating with the upper end of the rod to indicate the weight of the object to be weighed.

WILFRED H. YEAMANS.

REFERENCES CITED

The following references are of record in the file of this patent:

UNITED STATES PATENTS

| Number | Name | Date |
|---|---|---|
| 35,125 | Lawrence | Apr. 29, 1862 |
| 363,873 | Witherell | May 31, 1887 |
| 431,205 | Gilfillan | July 1, 1890 |